United States Patent
Ju et al.

(10) Patent No.: US 12,444,810 B2
(45) Date of Patent: Oct. 14, 2025

(54) BATTERY SYSTEM FOR A VEHICLE

(71) Applicants: HYUNDAI MOTOR COMPANY, Seoul (KR); KIA CORPORATION, Seoul (KR)

(72) Inventors: Jae Hyeon Ju, Seoul (KR); Tae Hyuck Kim, Asan-si (KR); Chang Mo Sung, Gunpo-si (KR); Mee Sun Oh, Hwaseong-si (KR); Min Seok Seo, Gimpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 744 days.

(21) Appl. No.: 17/879,494

(22) Filed: Aug. 2, 2022

(65) Prior Publication Data

US 2023/0253681 A1  Aug. 10, 2023

(30) Foreign Application Priority Data

Feb. 4, 2022  (KR) .................. 10-2022-0014929

(51) Int. Cl.
*H01M 50/507* (2021.01)
*H01M 50/264* (2021.01)
*H01M 50/581* (2021.01)

(52) U.S. Cl.
CPC ....... *H01M 50/507* (2021.01); *H01M 50/264* (2021.01); *H01M 50/581* (2021.01); *H01M 2200/103* (2013.01); *H01M 2220/20* (2013.01)

(58) Field of Classification Search
CPC .. H01B 7/0216; H01B 7/0225; H01B 7/0208; H02G 5/061
See application file for complete search history.

(56) References Cited

U.S. PATENT DOCUMENTS

| | | |
|---|---|---|
| 7,592,892 B2 | 9/2009 | Ito et al. |
| 10,784,668 B2 | 9/2020 | Ing et al. |
| 11,139,539 B2 | 10/2021 | Kim et al. |
| 11,139,543 B2 | 10/2021 | Yoo et al. |
| 2018/0309281 A1* | 10/2018 | Ichikawa ............ H01M 50/524 |
| 2020/0112014 A1 | 4/2020 | Kim et al. |
| 2020/0168887 A1 | 5/2020 | Yoo et al. |
| 2022/0166114 A1* | 5/2022 | Yun .................. H01M 10/653 |
| 2022/0415537 A1* | 12/2022 | Hwang ............. H01M 50/503 |

FOREIGN PATENT DOCUMENTS

| | | |
|---|---|---|
| JP | 2018098150 A | 6/2018 |
| KR | 102011736 B1 | 8/2019 |
| KR | 20190096674 A | 8/2019 |
| KR | 20210050983 A | 5/2021 |
| KR | 102270828 B1 | 6/2021 |
| WO | WO 2021/106996 * 3/2021 ............ H01M 50/20 |

\* cited by examiner

*Primary Examiner* — Amanda J Barrow
(74) *Attorney, Agent, or Firm* — Lempia Summerfield Katz LLC

(57) ABSTRACT

A battery system for vehicles has a bus bar or a wire harness, including portions with a high risk of short circuit inside the battery system. The bus bar or the wire harness is covered with an insulator in which a first insulator for the purpose of insulation and a second insulator for the purpose of heat resistance are laminated so that the first insulator is protected by the second insulator to thereby prevent thermal runaway of the battery system.

12 Claims, 9 Drawing Sheets

BATTERY SYSTEM FOR A VEHICLE

CROSS-REFERENCE TO RELATED APPLICATION

This application claims priority to and the benefit of Korean Patent Application No. 10-2022-0014929, filed on Feb. 4, 2022, in the Korean Intellectual Property Office, the disclosure of which is incorporated herein by reference.

BACKGROUND OF THE DISCLOSURE

1. Field of the Disclosure

The present disclosure relates to a battery system for vehicles. More particularly, the present disclosure relates to a battery system for vehicles having a bus bar or a wire harness. The bus bar or the wire harness includes portions with a high risk of short circuit inside the battery system. The bus bar or the wire harness is covered with an insulator in which a plurality of insulators is laminated so as to prevent thermal runaway of the battery system.

2. Description of the Related Art

Recently, due to high oil prices and global $CO_2$ regulations, the development of technologies for eco-friendly vehicles is accelerating. Accordingly, research on high-performance secondary cells capable of being repeatedly charged and discharged is being actively conducted.

Currently, commercialized secondary cells include a nickel cadmium cell, a nickel hydrogen cell, a nickel zinc cell, and a lithium secondary cell. Among the above cells, the lithium secondary cell is attracting attention because of the advantages of being freely charged and discharged, having a very low self-discharge rate, and having a high energy density. The lithium secondary cell has a high energy density because the memory effect hardly occurs compared to a nickel-based secondary cell.

Such a lithium secondary cell is generally composed of battery modules including a plurality of battery cells and a battery pack completed by assembling the battery modules. Such a lithium secondary cell is used as a power source for driving a motor of a vehicle such as an electric vehicle (EV), a hybrid electric vehicle (HEV), or a fuel cell electric vehicle (FCEV).

In order for the secondary cells to be electrically interconnected inside the battery module, electrode leads may be connected to one another, and the connected portions may be welded so as to maintain such a connected state. Further, the battery modules may have a parallel or series electrical connection in the secondary cells. For such a connection, one end of the electrode lead may be contact-fixed to a bus bar for electrical connection in the secondary cells by welding or the like.

In other words, the bus bar serves as a kind of wiring, and the current of each battery cell may be discharged to an external device through the bus bar or each battery cell may be charged by the external device through the bus bar. Generally, the bus bar through which current flows is covered with an insulating material so as to insulate the same from surrounding components.

Meanwhile, when overcurrent occurs in the battery module, thermal runaway may occur in a plurality of secondary cells, whereby the battery module may explode or catch fire. Particularly, current may be concentrated in the bus bar connected to an external device, which causes the insulating material covering the bus bar to melt due to the high heat generated in the bus bar. This can result in a short circuit with surrounding components.

For this reason, there is a need to additionally provide an insulating material for the purpose of heat resistance in addition to the insulating material for the purpose of insulating the bus bar.

In addition, generally, a vehicle is provided with a junction box containing a fuse configured to momentarily cut a circuit when current over a predetermined value flows so as to prevent excessive current from flowing to various electric components. The vehicle is also provided with a relay configured to operate when an input value reaches a predetermined value so as to open or close another circuit. In addition, a wire harness, connected to the junction box and supplying power thereto, has a ring terminal coupled thereto so as to be fixed to the junction box while being connected to the bus bar.

Here, the fuse and the relay are electrically connected to the battery modules through the wire harness. Therefore, it is common that the wire harness is also covered with an insulating material. However, there may be a problem in that the coated insulating material melts when the wire harness is disposed adjacent to the bus bar or passes through a narrow space between a plurality of battery modules depending on the arrangement.

The information disclosed in this Background of the Disclosure section is only to enhance understanding of the general background of the disclosure. Thus, the Background section should not be taken as an acknowledgement or any form of suggestion that this information forms the related art already known to a person having ordinary skill in the art.

SUMMARY OF THE DISCLOSURE

Therefore, the present disclosure has been made in view of the above problems. It is an object of the present disclosure to provide a battery system for vehicles having a bus bar or a wire harness, specifically, portions with a high risk of short circuit inside the battery system. The bus bar or the wire harness is covered with an insulator in which a first insulator for the purpose of insulation and a second insulator for the purpose of heat resistance are laminated. Thus, the first insulator is protected by the second insulator to prevent thermal runaway of the battery system.

In accordance with an aspect of the present disclosure, the above and other objects can be accomplished by the provision of a battery system of a vehicle. The battery system includes a battery pack mounted in a battery case, accommodating a plurality of battery modules therein, and electrically connected to respective terminals of a relay and a fuse. The battery system also includes a bus bar for wiring. The bus bar is connected to the battery pack, provided between an upper end portion and a lower end portion of the battery case, and covered with an insulator. The insulator may include a first insulator covering the bus bar in a lengthwise direction of the same and a second insulator made of a material having a higher heat resistance temperature than that of the first insulator and laminated on the first insulator.

The bus bar may be a first bus bar extending in a longitudinal or a lateral direction of the vehicle along an outer surface of the battery pack so as to electrically interconnect the plurality of battery modules in the battery pack.

The first bus bar may include a cross bus bar provided between an upper portion of the battery pack and the upper end portion of the battery case and crossing the battery pack in the longitudinal direction of the vehicle. The first bus bar may also include an extending bus bar connected to one end of an upper bus bar and extending in the lateral direction of the vehicle.

The cross bus bar may be disposed adjacent to a central portion of a vehicle body.

The extending bus bar may be provided in plural and disposed to face each other at front and rear sides of the vehicle. The cross bus bar may have one end connected to the extending bus bar disposed at the front side and another end connected to the extending bus bar disposed at the rear side.

The bus bar may be a second bus bar having one end connected to the battery pack and having another end connected to the terminal of the relay so as to electrically connect the terminal of the relay to the battery pack.

The bus bar may be a third bus bar having one end connected to the battery pack and having another end connected to the terminal of the fuse so as to electrically connect the terminal of the fuse to the battery pack.

The battery system according to the present disclosure may further include a wire harness connected to the battery pack so as to send current of each of the battery modules constituting the battery pack to the fuse or to the relay. The wire harness may be covered with the insulator.

The wire harness may be disposed to be adjacent to the bus bar so that a portion adjacent to the bus bar is covered with the insulator.

The wire harness may be disposed in a space between the plurality of battery modules and a portion adjacent to the battery modules may be covered with the insulator.

The battery system according to the present disclosure may further include a plurality of rods penetrating and fixing the battery case. The wire harness may be disposed to be adjacent to the rod so that a portion adjacent to the rod is covered with the insulator.

The second insulator may be made of an insulating material having a heat resistance temperature of at least 500° C. or higher.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION OF THE EMBODIMENTS

Reference is now made in detail to the embodiments of the present disclosure, examples of which are illustrated in the accompanying drawings. Wherever possible, the same reference numbers are used throughout the drawings to refer to the same or like parts.

Throughout the specification, when an element is referred to as "including" another element, it means that the element may include other elements as well, without excluding other elements, unless specifically stated otherwise.

Terms such as first and/or second may be used to describe various components but are only used to distinguish one element from another. For example, a first element could be called a second element, and similarly a second element could be called a first element, without departing from the scope of embodiments of the present disclosure. When a component, device, element, or the like of the present disclosure is described as having a purpose or performing an operation, function, or the like, the component, device, or element should be considered herein as being "configured to" meet that purpose or to perform that operation or function.

Hereinafter, the configuration and operating principle of various embodiments of the present disclosure are described in detail with reference to the accompanying drawings.

Figure 1:
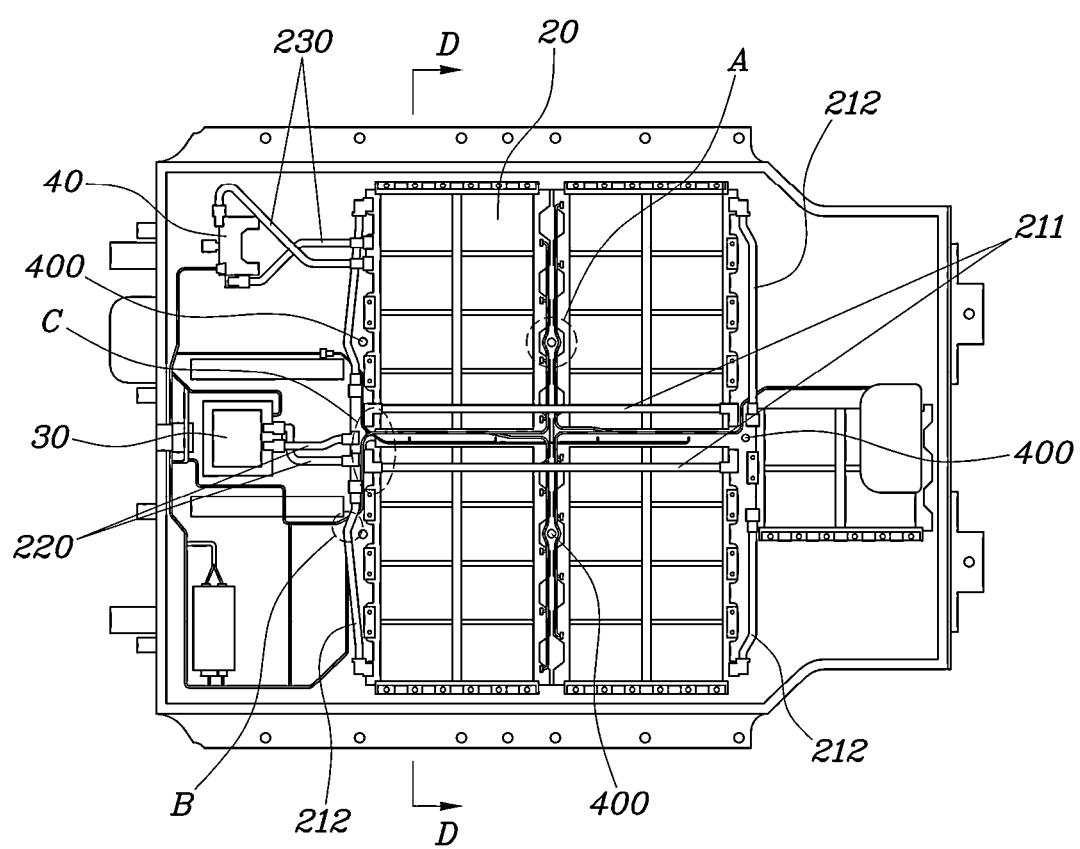
FIG. 1 is a view illustrating a battery system for vehicles according to an embodiment of the present disclosure.
Figure 2:
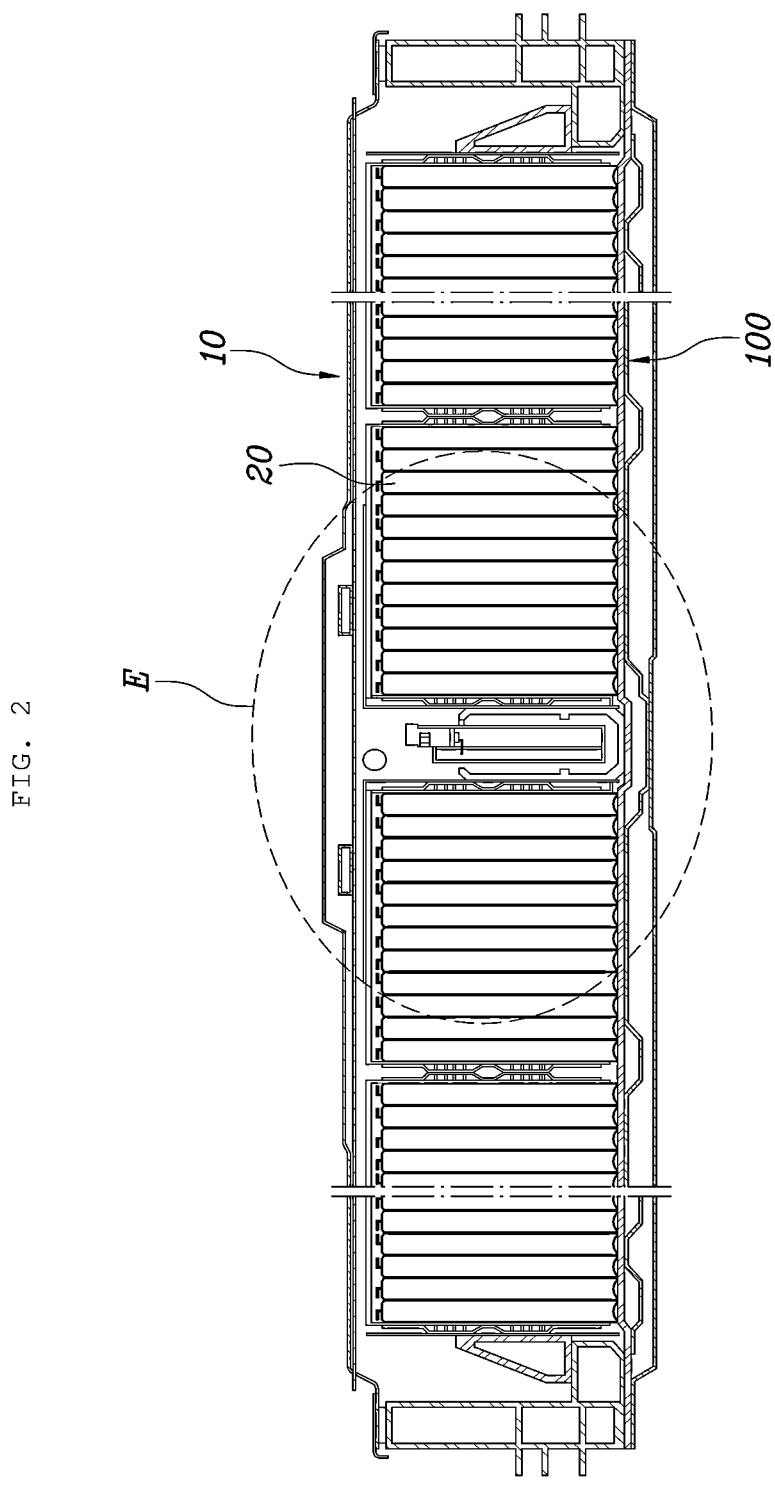
FIG. 2 is a cross-sectional view of area D-D in FIG. 1.
Figure 3:
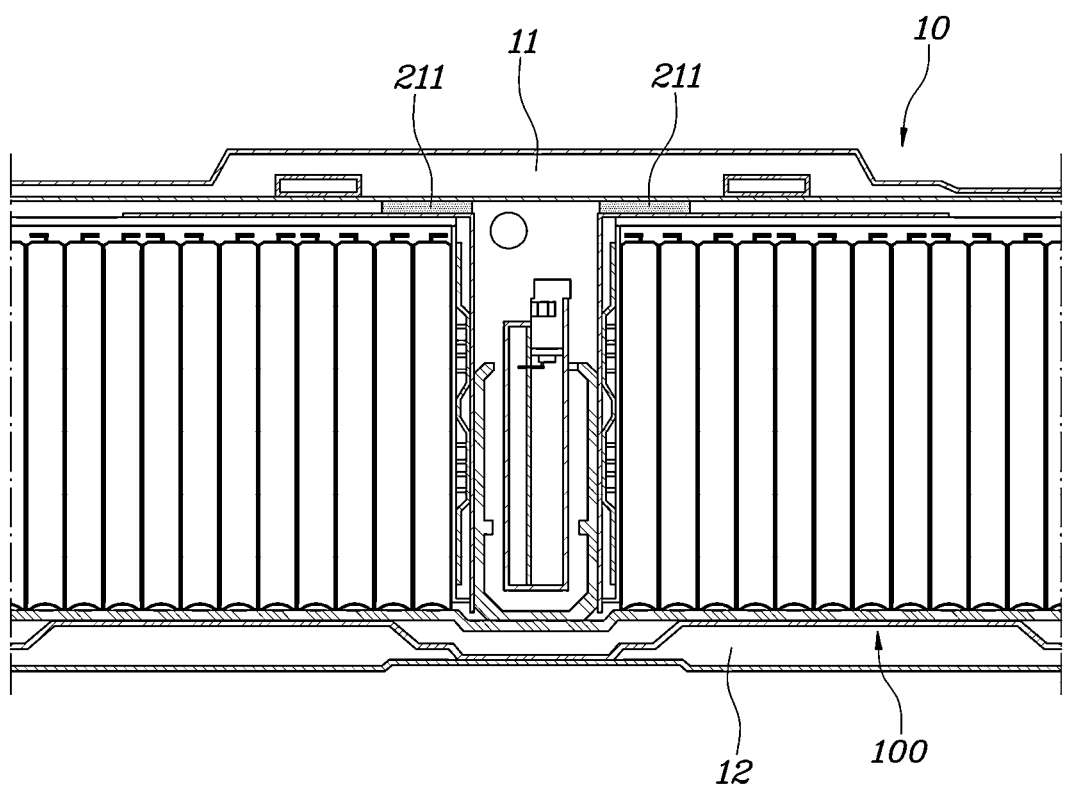
FIG. 3 is an enlarged view of area E in FIG. 2.
Figure 4:
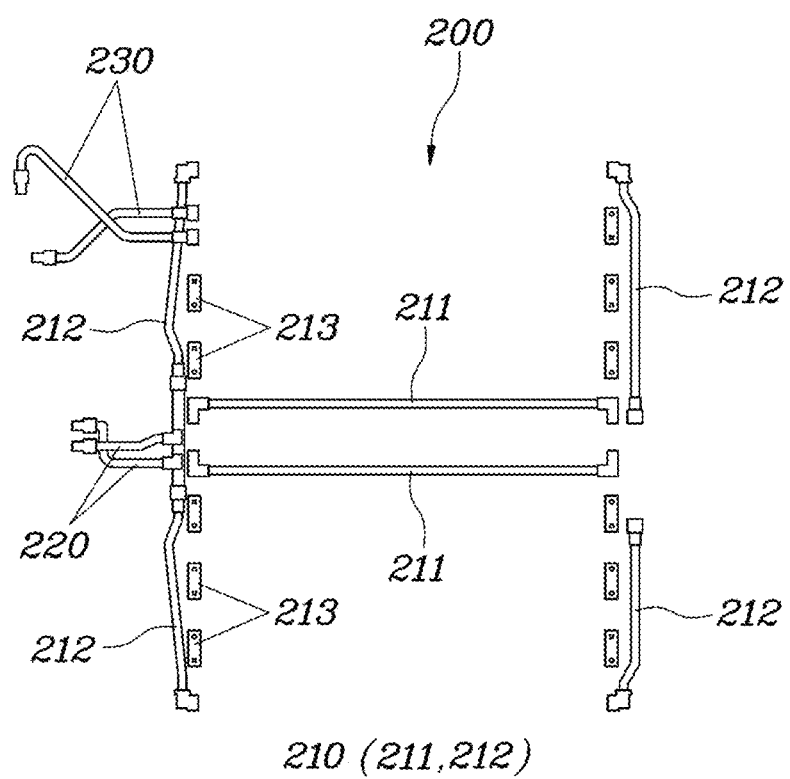
FIG. 4 is a view illustrating a bus bar according to an embodiment of the present disclosure.
Figure 5:
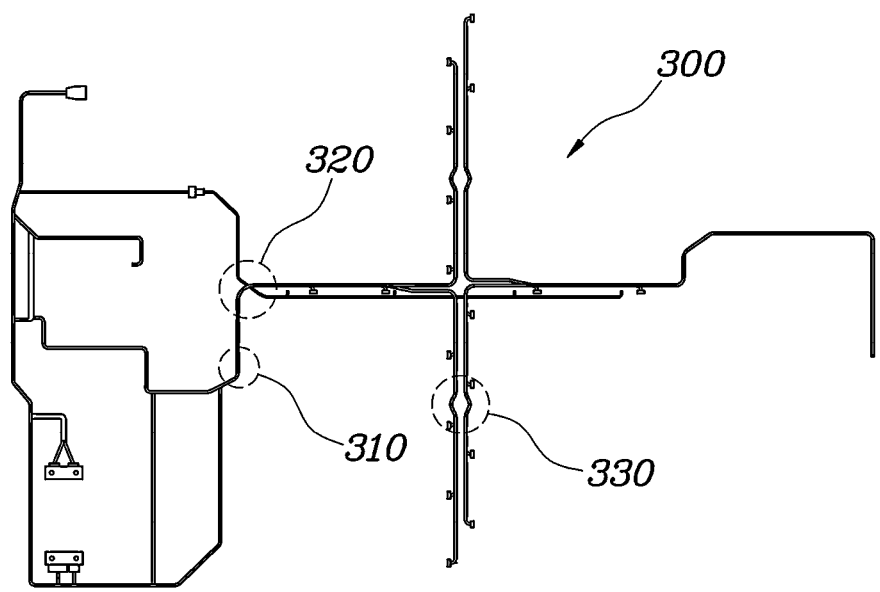
FIG. 5 is a view illustrating a wire harness according to an embodiment of the present disclosure.
Figure 6:
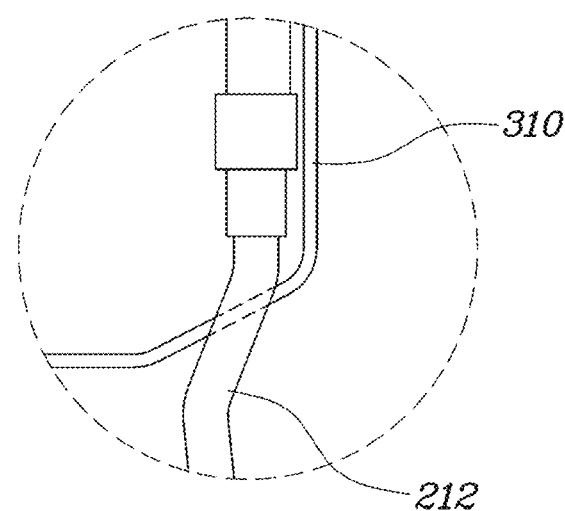
FIG. 6 is an enlarged view schematically illustrating area A in FIG. 1.
Figure 7:
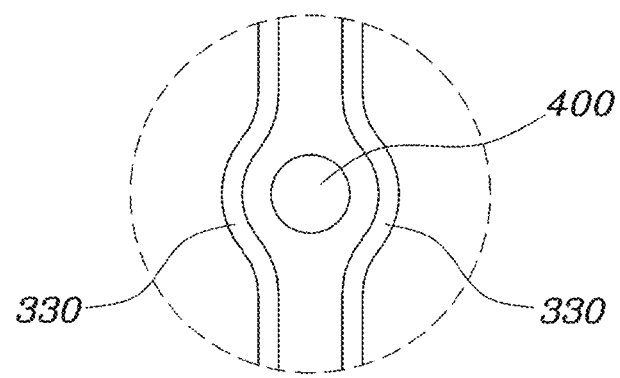
FIG. 7 is an enlarged view schematically illustrating area B in FIG. 1.
Figure 8:
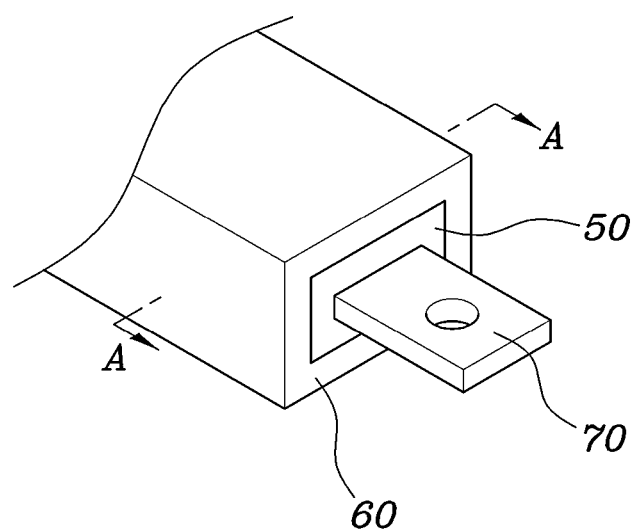
FIG. 8 is a view illustrating a bus bar covered with a first insulator and a second insulator.
Figure 9:
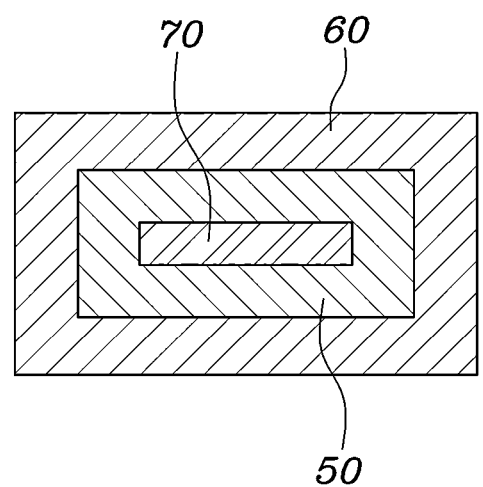
FIG. 9 is a cross-sectional view of area F-F in FIG. 8.

FIG. 1 is a view illustrating a battery system for vehicles according to an embodiment of the present disclosure. FIG. 2 is a cross-sectional view of area D-D in FIG. 1. FIG. 3 is an enlarged view of area E in FIG. 2. FIG. 4 is a view illustrating a bus bar 200 according to an embodiment of the present disclosure. FIG. 5 is a view illustrating a wire harness 300 according to an embodiment of the present disclosure. FIG. 6 is an enlarged view schematically illustrating area A in FIG. 1. FIG. 7 is an enlarged view schematically illustrating area B in FIG. 1. FIG. 8 is a view illustrating a bus bar covered with a first insulator and a second insulator. FIG. 9 is a cross-sectional view of area F-F in FIG. 8.

In order to aid in understanding the present disclosure, the basic components of a general battery system for vehicles is first described. Key features of each component of the present disclosure are then described.

Generally, a battery system for vehicles includes a battery pack 100 completed by assembling battery modules 20 including a plurality of battery cells. The battery system also includes a battery case 10 mounting the battery pack 100 therein. The battery system also includes a bus bar 200 for parallel or series electrical connection in battery modules 20. The battery system also includes a fuse 40 configured to momentarily cut a circuit when current over a predetermined value flows so as to prevent overcurrent from flowing in various electric components of the vehicle. The battery system also includes a relay 30 configured to operate when an input value reaches a predetermined value so as to open or close another circuit. The battery system also includes a wire harness 300 connected to the relay 30 so as to supply power to the same as basic components.

Accordingly, the battery system for vehicles according to the present disclosure, as basic components, has the battery pack 100 mounted in the battery case 10, and has the bus bar 200 for wiring provided between an upper end portion 11 and a lower end portion 12 of the battery case 10 and connected to the battery pack 100. The battery pack 100 is connected to a terminal of the relay 30 and a terminal of the fuse 40.

For reference, here, the bus bar 200 and the wire harness 300 serve as a kind of wiring and are generally coated with an insulating material so as to insulate the bus bar 200 and the wire harness 300 from surrounding components.

Meanwhile, a battery generates a lot of heat due to charging or discharging operation. When the battery does not properly manage heat, the electrolyte of the battery cell is vaporized. Thus, internal pressure of the cell is increased.

At this time, due to the increase in the internal pressure, the inside of the battery may be deformed, such as damage to a separator inside the battery, or a short circuit may occur inside the battery. Accordingly, as the combustible electrolyte material is vaporized and ejected, battery cells adjacent thereto are heated and fire may spread. Such a phenomenon is called "thermal runaway" and technology to prevent such a phenomenon needs to be developed.

This thermal runaway phenomenon may be particularly problematic in the bus bar 200 connected to an external device. In fact, since current is concentrated in the bus bar 200 and high heat is generated, the insulating material covering the bus bar 200 melts to expose the inside of the bus bar 200, resulting in a short circuit or arc with surrounding components.

In addition, the aforementioned wire harness 300 is a "collection of wires used for supplying electricity" and may be disposed in various spaces depending on the design of a battery circuit. Here, the wire harness 300 may be disposed adjacent to the bus bar 200 or disposed to pass through a narrow space between the plurality of battery modules 20. In this case, there is a problem in that the insulating material covering the wire harness 300 melts as well due to the high heat generated in the adjacent components.

Therefore, in the present disclosure, an insulating material for the purpose of heat resistance is additionally provided in addition to the insulating material for the purpose of insulation so as to cover the bus bar 200 or the wire harness 300. Thus, the occurrence of short circuit with the adjacent components due to the melting of the existing insulating coating may be prevented.

Here, depending on the arrangement of the bus bar 200 and the wire harness 300, a portion with a high risk of short circuit is individually specified, and the portion is covered with a heat-resistant insulating material. Thus, an effective application position of the material may be secured instead of simply additionally providing the material. Accordingly, additional heat-resistance coating may be performed only on a necessary portion. Thus, the material cost needed in securing the heat-resistant material is reduced, and the time needed in the coating process is also reduced.

Hereinafter, the technical characteristics of each component of the present disclosure are described in more detail with reference to the accompanying drawings.

FIG. 1 is a view illustrating a battery system for vehicles according to an embodiment of the present disclosure. FIG. 2 is a cross-sectional view of area D-D in FIG. 1. FIG. 3 is an enlarged view of area E in FIG. 2. FIG. 8 is a view illustrating a bus bar covered with a first insulator and a second insulator. FIG. 9 is a cross-sectional view of area F-F in FIG. 8.

Referring to FIGS. 1-3, 8, and 9, the battery system for vehicles according to the present disclosure includes the battery pack 100 mounted in the battery case 10, accommodating the plurality of battery modules 20 therein, and electrically connected to the terminal of the relay 30 and the terminal of the fuse 40. The battery system also includes the bus bar 200 for wiring, connected to the battery pack 100, provided between the upper end portion 11 and the lower end portion 12 of the battery case 10, and covered with an insulator 50 and an insulator 60. Here, the insulators 50 and 60 comprise a first insulator 50 covering the bus bar 200 in the lengthwise direction of the same and a second insulator 60 made of a material having a higher heat resistance temperature than that of the first insulator 50 and laminated on the first insulator 50.

Specifically, as illustrated in FIGS. 1 and 2, the battery pack 100 constituting the plurality of battery modules 20 is provided. The battery pack 100 is mounted in the battery case 10 and connected to each of the terminals of the relay 30 and the fuse 40, which are provided outside the battery case 10, using the bus bar 200.

The bus bar 200 is connected to the battery pack 100 so as to form a structure in which the battery modules 20 are connected to one another. The bus bar 200 is provided between the upper end portion 11 and the lower end portion 12 of the battery case 10 so as to interconnect each of the plurality of battery modules 20 or to connect respective terminals of the relay 30 and the fuse 40 to the battery pack 100.

Here, the space between the upper end portion 11 and the lower end portion 12 of the battery case 10 may be understood as the inner space of the battery case 10. When the bus bar 200 is connected to the respective terminals of the relay 30 and the fuse 40, the bus bar 200 may be provided to protrude from the inner space to the outside of the battery case 10.

Here, the upper end portion 11 and the lower end portion 12 of the battery case 10 may be easily understood with reference to FIG. 3. In other words, FIG. 1 may be understood as a view illustrating a state in which the upper end portion 11 of the battery case 10 is not coupled. This is only to aid in understanding of the present disclosure, and the content of the present disclosure is not limited by the drawings.

Meanwhile, referring to FIGS. 8 and 9, the bus bar 200 is covered with the insulators 50 and 60. The insulators 50 and 60 comprise the first insulator 50 covering the bus bar 200 in the lengthwise direction of the same and the second insulator 60 made of a material having a higher heat resistance temperature than that of the first insulator 50 and laminated on the first insulator 50.

Specifically, the bus bar 200 includes a metal bar 70 formed of an electrically conductive metal material so as to serve as wiring, the first insulator 50 covering the metal bar 70 in the lengthwise direction of the same, and the second insulator 60 surrounding the outer side of the first insulator 50.

Here, the first insulator 50 is an insulating material for the purpose of insulating and may be understood as a coating material of a general bus bar 200. Such a coating material is, for example, polyamide (Polyamide12, PA12), which has excellent insulation properties, but has a heat resistance temperature of about 125° C. to a maximum of 185° C.

When thermal runaway occurs inside the battery system for vehicles, high heat of 500° C. or higher is generally generated. Thus, the conventional insulating material, such as polyamide, has a problem in that the conventional insulating material exceeds the heat resistance limit and melts.

For this reason, the battery system for vehicles according to the present disclosure has a structure in which the second insulator 60, having a higher heat resistance temperature than the first insulator 50, is laminated on the first insulator 50 so as to prevent the above-described problem that the first insulator 50 melts. The structure in which the first insulator 50 and the second insulator 60 are stacked while surrounding the metal bar 70 may be clearly seen in FIG. 9 illustrating the cross section of the area F-F in FIG. 8.

Here, the second insulator 60 refers to an insulating material for heat resistance. As a result, the first insulator 50 is protected by the second insulator 60 for heat resistance. Thus, a problem in that the coating on the bus bar 200 melts, which causes a short circuit or arc between the bus bar 200 and adjacent components, is prevented. The safety of the battery system for vehicles in preparation for thermal runaway is thereby secured.

Meanwhile, the second insulator of the battery system for vehicles according to the present disclosure may be made of an insulating material having a heat resistance temperature of at least 500° C. or higher.

This is because, as described above, high heat of 500° C. or higher is generally generated when thermal runaway occurs inside the vehicle battery system. For this reason, the insulator is made of such an insulating material so as to secure heat resistance performance in which the insulator does not melt at such a high temperature.

Here, for the insulating material having a heat-resistant temperature of at least 500° C., it is desirable to use a material having a heat-resistant temperature of at least about 850° C. to a maximum of 1,300° C., considering the unit price and ease of purchase of products on the market as a heat-resistant coating material.

However, it is not necessarily limited to the above described heat-resistant temperature range. A variety of materials may be used as long as the materials are capable of maintaining heat-resistant performance even when thermal runaway occurs inside the battery system for vehicles. The content of the present disclosure should not be viewed as being limited by such a heat-resistant temperature range.

FIG. 1 is a view illustrating the battery system for vehicles according to an embodiment of the present disclosure. FIG. 4 is a view illustrating the bus bar 200 according to an embodiment of the present disclosure.

Referring to FIGS. 1 and 4, the bus bar of the battery system for vehicles according to the present disclosure is a first bus bar 210. The first bus bar 210 extends in the longitudinal or lateral direction of the vehicle along the outer surface of the battery pack 100 so as to electrically interconnect the plurality of battery modules 20 in the battery pack 100.

FIG. 4 is a view of the bus bar 200 taken from FIG. 1. In FIG. 4, the first bus bar 210 extends in the longitudinal or lateral direction of the vehicle and is formed along the outer surface of the battery pack 100 to thereby electrically interconnect the plurality of battery modules 20 in the battery pack.

Generally, the battery modules 20 are electrically connected to one another by bonding electrode leads to the bus bar 200. In order to electrically connect the secondary cells in parallel, electrode leads having the same polarity are connected to each other and bonded. In order to electrically connect the secondary cells in series, electrode leads having different polarities are connected to each other and bonded.

In other words, in the battery system for vehicles according to the present disclosure, the plurality of battery modules 20 is uniformly disposed and the electrode leads exposed outwardly of the battery modules 20 are bonded to the first bus bar 210 to thereby implement the above described series or parallel electrical connection.

Specifically, a bus bar extending in the lateral direction of the vehicle connects the plurality of battery modules 20 in series. A bus bar extending in the longitudinal direction of the vehicle connects the plurality of battery modules 20 in parallel. The first bus bar 210 having a minimum length is used to allow the current generated in each battery module 20 to efficiently flow through the first bus bar 210 to a driving device of the vehicle.

Moreover, the first bus bar 210 arranged in this way is covered by the aforementioned insulators 50 and 60, so that the first bus bar 210 is protected from high heat generated by overcurrent or the like. Thus, thermal runaway of the battery system may be prevented while each of the battery modules 20 is effectively interconnected.

Meanwhile, FIG. 4 illustrates a connecting bus bar 213 that directly connects two adjacent battery modules 20. The connecting bus bar 213 directly connecting adjacent modules generally has a structure in which a metal bar is inserted inside an insulating plastic. Thus, heat resistance performance is secured by the insulating plastic even in a thermal runaway situation. Therefore, it is desirable that such a connecting bus bar 213 is not included in the first bus bar 210, which is a component of the present disclosure.

FIG. 2 is a cross-sectional view of area D-D in FIG. 1. FIG. 3 is an enlarged view of area E in FIG. 2. FIG. 4 is a view illustrating the bus bar 200 according to an embodiment of the present disclosure. FIG. 5 is a view illustrating the wire harness 300 according to an embodiment of the present disclosure.

Referring to FIGS. 2-5, the first bus bar 210 of the battery system for vehicles according to the present disclosure may include a cross bus bar 211 provided between an upper portion of the battery pack 100 and the upper end portion 11 of the battery case 10 and crossing the battery pack 100 in the longitudinal direction of the vehicle. The first bus bar 210 may also include an extending bus bar 212 connected to one end of an upper bus bar and extending in the lateral direction of the vehicle.

Here, the cross bus bar 211 may be understood to be the aforementioned bus bar extending in the longitudinal direction of the vehicle. The extending bus bar 212 may be understood to be the aforementioned bus bar extending in the lateral direction of the vehicle.

Here, the cross bus bar 211 is provided between the upper portion of the battery pack 100 and the upper end portion 11 of the battery case 10, as illustrated in FIG. 3. In other words, the cross bus bar 211 is provided by utilizing the space formed between the upper portion of the battery pack 100 and the upper end portion 11 of the battery case 10 so as to allow the battery modules 20 to be electrically connected to one another while using a minimum space.

Alternatively, the cross bus bar 211 may be provided between the lower portion of the battery pack 100 and the lower end portion 12 of the battery case 10 as well. However, this may not be desirable in consideration of the installation process of the battery system in the manufacturing process of the vehicle.

More specifically, in a general battery system mounting process, the battery pack 100 in which the plurality of battery modules 20 is assembled is mounted on the lower end portion 12 of the battery case 10. Then the upper end portion 11 of the battery case 10 is coupled thereto so as to cover the same. Here, when the cross bus bar 211 is provided between the lower portion of the battery pack 100 and the lower end portion 12 of the battery case 10, the cross bus bar 211 may be impacted or scratched in the process of mounting the battery pack 100.

Accordingly, a problem may occur in which the coating of the insulators 50 and 60 including the first insulator 50 and the second insulator 60 according to the present disclosure is peeled off or damaged.

For this reason, in the battery system for vehicles according to the present disclosure, the cross bus bar 211 is provided between the upper portion of the battery pack 100 and the upper end portion 11 of the battery case 10. This prevents damage to the insulators 50 and 60 as described above and makes the manufacturing process of the vehicle more convenient.

Further, referring to FIGS. 1 and 4, the cross bus bar 211 of the battery system for vehicles according to the present disclosure may be disposed adjacent to the central portion of the vehicle body.

Accidents may occur while a vehicle is traveling, and most accidents are caused by collisions. Such collisions may be classified into front, rear, and side collisions.

In a case in which the cross bus bar 211 is disposed adjacent to the edge of the vehicle body rather than being disposed adjacent to the central portion of the same, the cross bus bar 211 may be broken or bent when a side collision occurs while the vehicle is traveling. In this case, the insulators 50 and 60 coated on the cross bus bar 211 are not properly adhered to the metal bar 70 inside the bus bar and are lifted or torn. Thus, the inside of the cross bus bar 211 is exposed.

For this reason, in the battery system for vehicles according to the present disclosure, the cross bus bar 211 is disposed to be adjacent to the central portion of the vehicle body as far away from the side portion of the vehicle body as possible so as to avoid the above mentioned problem.

This may prevent damage to the insulators 50 and 60 composed of the first insulator 50 and the second insulator 60, thereby more effectively preparing for thermal runaway that occurs inside the battery system for vehicles.

Meanwhile, since the extending bus bar 212 is formed to extend in the lateral direction of the vehicle body, the above mentioned problem may occur due to front or rear collision. However, as illustrated in FIG. 1, the extending bus bar 212 is disposed inside by a predetermined range from the front or rear of the vehicle. Thus, even if a collision occurs, the impact generated by the collision is not directly transmitted to the extending bus bar 212.

For this reason, in the battery system for vehicles according to the present disclosure, only the cross bus bar 211 in the first bus bar 210, excluding the extending bus bar 212, is disposed to be adjacent to the central portion of the vehicle body.

Meanwhile, the extending bus bar 212 of the battery system for vehicles according to the present disclosure is provided in plural and disposed to face each other at the front and the rear of the vehicle. Here, one side of the cross bus bar 211 may be connected to the extending bus bar 212 disposed at the front. Another side of the cross bus bar 211 may be connected to the extending bus bar 212 disposed at the rear.

Specifically, the extending bus bars 212 face each other in the front-rear direction of the vehicle and may be disposed adjacent to the outer surface of the battery pack 100.

Generally, in the battery system for vehicles, the battery modules 20 are uniformly arranged in order to mount as many battery modules 20 as possible. In addition, because each of the battery modules 20 has an electrode lead exposed to the outside, the electrode leads exposed outwardly from the battery modules 20, the battery modules 20 disposed on the outermost side, are exposed to the outside of the battery pack 100 and arranged in a line.

In other words, the extending bus bars 212 of the battery system for vehicles according to the present disclosure face each other in the front-rear direction of the vehicle and are disposed adjacent to the outer surface of the battery pack 100. This effectively interconnects the electrode leads arranged in a line to one another as described above.

In addition, one side of the cross bus bar 211 is connected to the extending bus bar 212 disposed at the front and another side of the cross bus bar 211 is connected to the extending bus bar 212 disposed at the rear. Thus, all the battery modules 20 constituting the battery system are electrically connected in series or in parallel.

Meanwhile, the bus bar 200 of the battery system for vehicles according to the present disclosure is the second bus bar 220 having one side connected to the battery pack 100 and having another side connected to the terminal of the relay 30. This electrically connects the terminal of the relay 30 to the battery pack 100.

As described above, the relay 30 adopted in the battery system for vehicles is operated when an input value reaches a predetermined value. This opens or closes another circuit to cut off or pass the high voltage current supplied from the battery. Thus, the power supplied to a driving unit is regulated.

In other words, the relay 30 is a component that regulates the supply power on the premise that high voltage current is conducted. Here, the second bus bar 220, which is connected to the terminal of the relay 30 so as to electrically connect the battery pack 100 to the relay 30, needs to prevent overheating that occurs when a high voltage current is applied.

For this reason, in the battery system for vehicles according to the present disclosure, the second bus bar 220 connected to the relay 30 is covered with the insulators 50 and 60, composed of the first insulator 50 and the second insulator 60, to thereby improve the safety of the battery system.

Meanwhile, the bus bar 200 of the battery system for vehicles according to the present disclosure is a third bus bar 230 having one side connected to the battery pack 100 and having another side connected to the terminal of the fuse 40. This electrically connects the terminal of the fuse 40 to the battery pack 100.

As described above, the fuse 40 adopted in the battery system for vehicles is a component configured to prevent overcurrent from flowing in various electric components of the vehicle and perform a function of momentarily blocking the circuit when current of a predetermined value or more flows.

In other words, the fuse 40 is a component that performs a circuit breaker function on the premise that overcurrent occurs. Here, the third bus bar 230, which is connected to the terminal of the fuse 40 so as to electrically connect the battery pack 100 to the fuse 40, needs to prevent overheating that occurs when overcurrent is applied.

For this reason, in the battery system for vehicles according to the present disclosure, the third bus bar 230 connected to the fuse 40 is covered with the insulators 50 and 60, composed of the first insulator 50 and the second insulator 60, to thereby improve the safety of the battery system.

FIG. 1 is a view illustrating the battery system for vehicles according to an embodiment of the present disclosure. FIG. 5 is a view illustrating the bus bar 200 and the wire harness 300 according to an embodiment of the present disclosure.

Referring to FIGS. 1 and 5, the battery system for vehicles according to the present disclosure further includes the wire harness 300 connected to the battery pack 100 so as to supply current of each of the battery modules 20 constituting the battery pack 100 to the fuse 40 or to the relay 30. The wire harness 300 is covered with the insulators 50 and 60.

As mentioned above, the wire harness 300 is a "collection of wires used for supplying electricity" and may be disposed in various spaces depending on the design of the battery circuit.

Referring in detail with reference to FIGS. 1 and 5, the wire harness 300 is disposed in the space between each of the battery modules 20 in the battery pack 100, is exposed to the outside of the battery case 10, and is connected to the fuse 40 and the relay 30. In addition, since the wire harness 300 is mounted in the battery system while overlapping a predetermined portion of the bus bar 200 in the state illustrated in FIG. 5, the area "A" adjacent to the bus bar 200 is also created.

In other words, such a wire harness 300 adjacent to components, which have a risk of generating high heat while the battery is being driven, has a problem in that, due to the high heat generated by adjacent components, the insulating material covering the wire harness 300 melts, resulting in the wire harness 300 being short-circuited.

For this reason, in the battery system for vehicles according to the present disclosure, not only the bus bar 200 but also the wire harness 300 are covered with the insulators 50 and 60, composed of the first insulator 50 and the second insulator 60. This prevents the above mentioned problem and provides a battery system with improved safety.

Here, the entire wire harness 300 may be covered with the first insulator 50 and the second insulator 60. However, it may also be possible to cover only a portion of the wire harness 300, which is adjacent to the components that may generate high heat, with the first insulator 50 and the second insulator 60, and to cover the rest of the wire harness 300 with only the first insulator 50. As such, when only a portion is partially covered, additional heat-resistance coating may be performed only on a necessary portion. Thus, the material cost needed in securing the heat-resistant material may be reduced, and the time needed in the coating process is also reduced.

In this regard, hereinafter, each portion is specifically specified and described.

FIG. 1 is a view illustrating the battery system for vehicles according to an embodiment of the present disclosure FIG. 6 is an enlarged view schematically illustrating area A in FIG. 1.

Referring to FIGS. 1 and 6, the wire harness 300 of the battery system for vehicles according to the present disclosure may be disposed to be adjacent to the bus bar 200. A portion adjacent to the bus bar 200 may be covered with the insulator.

As previously seen in FIG. 5, the wire harness 300 is mounted to overlap a predetermined portion of the bus bar 200, when mounted in the battery system. Here, "mounted to overlap" may be understood as meaning that the bus bar 200 is mounted on the wire harness 300 in a state in which the wire harness 300 is already installed in the battery system.

Referring to FIG. 6 illustrating an enlarged view of the area "A" in FIG. 1, the wire harness 300 extends downward in the drawing and then passes under the extension bus bar 212. Thus, a portion adjacent to the extending bus bar 212 is created.

In other words, the wire harness 310 adjacent to the bus bar refers to a portion corresponding to the area "A" in FIG. 1. The portion of the wire harness 310 adjacent to the bus bar is also shown in FIG. 5.

Since the bus bar 200 is a component that may generate high heat, the wire harness 310 adjacent thereto needs additional coating using a heat-resistant material. For this reason, in the battery system for vehicles according to the present disclosure, the wire harness 310 adjacent to the bus bar is covered with the first insulator 50 and the second insulator 60.

For reference, here, "A" is merely an example for aiding in understanding the present disclosure. It should not be seen that the content of the present disclosure is limited by the description of the drawing.

In addition, the wire harness 300 of the battery system for vehicles according to the present disclosure is disposed in a space between the plurality of battery modules 20. A portion adjacent to the battery modules 20 may be covered with the insulators 50 and 60.

As illustrated in FIG. 1, the wire harness 300 may be disposed in a space between each of the battery modules 20 in the battery pack 100. In order to improve the output of the vehicle, it is desirable to mount the maximum number of battery modules 20 in the vehicle. Therefore, generally, the space between each of the battery modules 20 is very narrow. In addition, the battery module 20 has a structure in which electrode leads of the battery are exposed to the outside of the battery modules 20.

Meanwhile, when driving the battery system, a lot of heat is generated by the charging or discharging operation of the battery, which causes the temperature of the battery to rise. At this time, the temperature does not rise evenly over the entire area of the battery but overheating occurs intensively in the electrode leads.

For this reason, the wire harness 320, disposed adjacent to the area in which the plurality of overheated electrode leads is exposed while passing through the narrow space between the plurality of battery modules 20, also needs to be additionally coated using a heat-resistant material.

Such an area is indicated as "C" in FIG. 1. However, this is merely an example to aid in understanding the present disclosure. It should not be understood that the content of the present disclosure is limited by the description of the drawing.

FIG. 1 is a view illustrating the battery system for vehicles according to an embodiment of the present disclosure. FIG. 7 is an enlarged view schematically illustrating area "B" in FIG. 1.

Referring to FIGS. 1 and 7, the battery system for vehicles according to the present disclosure may further include a plurality of rods 400 penetrating and fixing the battery case 10. The wire harness 300 may be disposed to be adjacent to the rod 400 and a portion adjacent to the rod 400 may be covered with the insulators 50 and 60.

Because the battery case 10 is composed of the upper end portion 11 and the lower end portion 12, it is desirable to separately provide a fixing part in addition to a fastening part for fastening when the upper end portion 11 and the lower end portion 12 are coupled to each other. In other words, the fixing part minimizes the movement of the battery case 10 so as to prevent vibration or shock caused by the movement of the battery case 10 from being transmitted to the battery pack 100 mounted in the battery case 10.

For this reason, the battery system for vehicles according to the present disclosure further includes the plurality of rods 400 penetrating and fixing the battery case 10. Of course, here, the rods 400 pass through the battery case 10 but must bypass the battery modules 20 inside the battery pack 100. In other words, the rods 400 may be disposed in the space between the battery modules 20 as shown in the area "B" in FIG. 1. The rods 400 may be made of aluminum.

Meanwhile, as described above, the wire harness 300 may also be disposed in the space between the plurality of battery modules 20. Therefore, as illustrated in FIG. 7, the wire harnesses 330 may be disposed adjacent to the rods.

Here, when the material coated on the wire harness 300, disposed in the space between the battery modules 20, melts by the plurality of overheated electrode leads, a short circuit with the aluminum rod 400 may additionally occur.

For this reason, the wire harness 330 adjacent to the rod also needs to be coated using a heat-resistant material.

For reference, here, "B" is merely an example for aiding in understanding of the present disclosure. It should not be seen that the content of the present disclosure is limited by the description of the drawing.

As is apparent from the above description, the present disclosure provides a battery system for vehicles having a bus bar or a wire harness, specifically portions with a high risk of short circuit inside the battery system. The bus bar or the wire harness is covered with an insulator in which a first insulator for the purpose of insulation and a second insulator for the purpose of heat resistance are laminated so that the first insulator is protected by the second insulator to thereby prevent thermal runaway of the battery system.

Although embodiments of the present disclosure have been disclosed for illustrative purposes, those having ordinary skill in the art should appreciate that various modifications, additions, and substitutions are possible without departing from the scope and spirit of the disclosure as disclosed in the accompanying claims.

What is claimed is:

1. A battery system of a vehicle, the battery system comprising:
    a battery pack mounted in a battery case, accommodating a plurality of battery modules therein, and electrically connected to respective terminals of a relay and a fuse; and
    a bus bar for wiring, the bus bar being connected to the battery pack, provided between an upper end portion and a lower end portion of the battery case, and covered with an insulator,
    wherein the insulator comprises a first insulator covering the bus bar in a lengthwise direction of the same, and a second insulator made of a material having a higher heat resistance temperature than that of the first insulator and laminated on the first insulator.

2. The battery system according to claim 1, wherein the bus bar is a first bus bar extending in a longitudinal or a lateral direction of the vehicle along an outer surface of the battery pack so as to electrically interconnect the plurality of battery modules in the battery pack.

3. The battery system according to claim 2, wherein the first bus bar comprises:
    a cross bus bar provided between an upper portion of the battery pack and the upper end portion of the battery case and crossing the battery pack in the longitudinal direction of the vehicle; and
    an extending bus bar connected to one end of an upper bus bar and extending in the lateral direction of the vehicle.

4. The battery system according to claim 3, wherein the cross bus bar is disposed adjacent to a central portion of a vehicle body.

5. The battery system according to claim 3, wherein:
    the extending bus bar is provided in plural and disposed to face each other at front and rear sides of the vehicle, and
    the cross bus bar has one end connected to the extending bus bar disposed at the front side, and another end connected to the extending bus bar disposed at the rear side.

6. The battery system according to claim 1, wherein the bus bar is a second bus bar having one end connected to the battery pack and having another end connected to the terminal of the relay so as to electrically connect the terminal of the relay to the battery pack.

7. The battery system according to claim 1, wherein the bus bar is a third bus bar having one end connected to the battery pack and having another end connected to the terminal of the fuse so as to electrically connect the terminal of the fuse to the battery pack.

8. The battery system according to claim 1, further comprising a wire harness connected to the battery pack so as to send current of each of the battery modules constituting the battery pack to the fuse or to the relay,
    wherein the wire harness is covered with the insulator.

9. The battery system according to claim 8, wherein the wire harness is disposed to be adjacent to the bus bar, so that a portion adjacent to the bus bar is covered with the insulator.

10. The battery system according to claim 8, wherein the wire harness is disposed in a space between the plurality of battery modules, and a portion adjacent to the battery modules is covered with the insulator.

11. The battery system according to claim 8, further comprising a plurality of rods penetrating and fixing the battery case,
    wherein the wire harness is disposed to be adjacent to the rod, so that a portion adjacent to the rod is covered with the insulator.

12. The battery system according to claim 1, wherein the second insulator is made of an insulating material having a heat resistance temperature of at least 500° C. or higher.

* * * * *